United States Patent
Rihn et al.

(10) Patent No.: US 9,020,615 B2
(45) Date of Patent: Apr. 28, 2015

(54) STABILITY CONTROL SYSTEM

(75) Inventors: Bernard K. Rihn, Snohomish, WA (US); Avi R. Geiger, Seattle, WA (US); Andrew W. Hill, Redmond, WA (US); Joseph B. Gault, West Linn, OR (US); Stephen C. Klein, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 721 days.

(21) Appl. No.: 13/312,448

(22) Filed: Dec. 6, 2011

(65) Prior Publication Data
US 2013/0144446 A1 Jun. 6, 2013

(51) Int. Cl.
| | |
|---|---|
| G05B 11/01 | (2006.01) |
| G05B 9/02 | (2006.01) |
| G06F 1/16 | (2006.01) |
| H05K 5/00 | (2006.01) |
| H05K 7/00 | (2006.01) |
| F16M 11/10 | (2006.01) |
| F16M 11/18 | (2006.01) |
| F16M 11/20 | (2006.01) |

(52) U.S. Cl.
CPC ............ *G06F 1/1601* (2013.01); *F16M 11/10* (2013.01); *F16M 11/18* (2013.01); *F16M 11/2021* (2013.01); *G06F 1/16* (2013.01); *G06F 1/1681* (2013.01); *G06F 2200/1612* (2013.01); *G06F 2200/1631* (2013.01)

(58) Field of Classification Search
USPC ............. 248/917–923; 361/679, 681; 700/19, 700/21, 79
See application file for complete search history.

(56) References Cited

U.S. PATENT DOCUMENTS

| | | | | |
|---|---|---|---|---|
| 5,170,197 A | * | 12/1992 | Schmidt et al. | ............... 396/428 |
| 5,718,043 A | | 2/1998 | Pearson | |

(Continued)

FOREIGN PATENT DOCUMENTS

| | | |
|---|---|---|
| CN | 1720008 | 1/2006 |
| CN | 2881760 Y | 3/2007 |

(Continued)

OTHER PUBLICATIONS

Verner, et al., "Force & Torque Feedback vs Force Only Feedback", Retrieved at <<http://ieeexplore.ieee.org/stamp/stamp.jsp?tp=&arnumber=4810880>>, Proceedings Third Joint EuroHaptics conference and Symposium on Haptic Interfaces for Virtual Environment and Teleoperator Systems, Mar. 18-20, 2009, pp. 406-410.

(Continued)

*Primary Examiner* — Ronald Hartman, Jr.
(74) *Attorney, Agent, or Firm* — Jeremy Snodgrass; Judy Yee; Micky Minhas

(57) ABSTRACT

In embodiments of a stability control system, a computing device includes a device housing that is integrated with a display device, and the device housing tilts for multiple display positions. Pivotable components are mechanically-linked and pivot in coordination to position the device housing in a display position, and sensors detect positioning inputs that are received to re-position the device housing. Clutch mechanisms are implemented to limit and/or resist movement of the pivotable components based on the positioning inputs. A stability controller can be implemented to control the clutch mechanisms based on sensor data from the sensors to position the device housing in a display position.

20 Claims, 5 Drawing Sheets

(56) References Cited

U.S. PATENT DOCUMENTS

| | | | |
|---|---|---|---|
| 5,743,503 A * | 4/1998 | Voeller et al. | 248/284.1 |
| 6,478,275 B1 * | 11/2002 | Huang | 248/284.1 |
| 6,675,070 B2 | 1/2004 | Lapham | |
| 6,974,362 B2 | 12/2005 | Lindell et al. | |
| 7,277,275 B2 | 10/2007 | Won et al. | |
| 7,395,967 B2 | 7/2008 | Melville | |
| 7,500,853 B2 | 3/2009 | Bevirt et al. | |
| 7,551,432 B1 | 6/2009 | Bockheim et al. | |
| 7,573,711 B2 | 8/2009 | Kim et al. | |
| 7,623,121 B2 | 11/2009 | Dodge | |
| 7,630,193 B2 | 12/2009 | Ledbetter et al. | |
| 7,685,885 B2 | 3/2010 | Cowgill | |
| 7,773,371 B2 | 8/2010 | Hillman et al. | |
| 7,898,429 B2 | 3/2011 | Hwang et al. | |
| 2002/0088933 A1 | 7/2002 | Yu et al. | |
| 2005/0258323 A1 * | 11/2005 | Lin | 248/278.1 |
| 2006/0022108 A1 | 2/2006 | Kuga | |
| 2006/0044288 A1 | 3/2006 | Nakamura et al. | |
| 2006/0071135 A1 | 4/2006 | Trovato | |
| 2006/0256081 A1 * | 11/2006 | Zalewski et al. | 345/156 |
| 2007/0007413 A1 * | 1/2007 | Jung et al. | 248/284.1 |
| 2007/0058329 A1 | 3/2007 | Ledbetter et al. | |
| 2008/0158801 A1 | 7/2008 | Mathews | |
| 2008/0237424 A1 * | 10/2008 | Clary | 248/283.1 |
| 2012/0033371 A1 * | 2/2012 | Pankros et al. | 361/679.21 |
| 2013/0141209 A1 | 6/2013 | Rihn | |

FOREIGN PATENT DOCUMENTS

| | | |
|---|---|---|
| CN | 102128337 | 7/2011 |
| CN | 102217289 | 10/2011 |

OTHER PUBLICATIONS

"PCT Search Report and Written Opinion", *Application* No. PCT/US2012/067809, (Mar. 29, 2013), 10 pages.

"PCT Search Report and Written Opinion", *Application* No. PCT/US2012/067810, (Mar. 29, 2013), 9 pages.

"Non-Final Office Action", U.S. Appl. No. 13/312,559, Feb. 13, 2014, 12 pages.

Tahmasebi, Amir M., et al., "Dynamic Parameter Identification and Analysis of a PHANToM Haptic Device", *2005 IEEE Conference on Control Applications Toronto*, Aug. 28-31, 2005, available at <http://ieeexplore.ieee.org/stamp/stamp.jsp?tp=&arnumber=1507303&userType=inst>,(Aug. 28, 2005), pp. 1251-1256.

Vischer, Dieter et al., "Design and Development of High-Performance Torque-Controlled Joints", *IEEE Transactions on Robotics and Automation*, vol. 11, No. 4, Aug. 1995, available at <http://ieeexplore.ieee.org/stamp/stamp.jsp?arnumber=00406938>,(Aug. 1995), pp. 537-544.

"Final Office Action", U.S. Appl. No. 13/312,559, Aug. 1, 2014, 14 pages.

"Foreign Office Action", CN Application No. 201210518890.6, Mar. 2, 2015, 13 pages.

* cited by examiner

STABILITY CONTROL SYSTEM

BACKGROUND

Various types of computing and media devices, such as desktop computers, portable computing devices, televisions, and other display devices, are increasingly designed with a touch-screen display for user input and touch interaction. The various types of devices, as well as an all-in-one computer (PC) with a movable display, can be designed for multi-position display, and used in an upright position as a vertical display, flat on a table as a horizontal display, or in an angled position between vertical and horizontal. For a device such as an all-in-one PC with a movable display, a number of display positions are undesirable for either usability, or balance and stability reasons. Further, for a multi-pivot link, the display positions depend on the rotation of multiple dependent axes, and locking out undesirable display positions requires coordination between the multiple dependent axes with complicated and costly mechanical linkages.

When a set of masses that are connected by two axes are moved, mechanical counter-balancing quickly becomes difficult or impossible unless one or both of the axes are positioned at the center of each connected mass, which makes the respective counter-balance force zero. The counter-balance force needed at each axis is dependent on the angle relative to the surface base for both masses. Further, because the two angles for the axes are un-related, the spring resistance needs to be non-linearized, such as by a CAM or other device, and the forces need be correlated through some linkage between the two axes. Designing such a precise counter-balanced mechanical system is prohibitive in a small form factor and, if not designed well, can result in a poor user experience and feel when the display device is moved or tilted. Without precise counter-balancing, the apparent weight of the masses will change across the range of motion of the device. In most cases, a friction component is added to compensate for any mismatch in counter-balancing so that the device doesn't drift or fall over, which once again, results in a poor user feel when the display device is adjusted to a display position.

SUMMARY

This Summary introduces simplified concepts of a stability control system, and the concepts are further described below in the Detailed Description and/or shown in the Figures. This Summary should not be considered to describe essential features of the claimed subject matter, nor used to determine or limit the scope of the claimed subject matter.

A stability control system is described. In embodiments, a computing device includes a device housing that is integrated with a display device, and the device housing tilts for multiple display positions. Pivotable components are mechanically-linked and pivot in coordination to position the device housing in a display position, and sensors detect positioning inputs that are received to re-position the device housing. Clutch mechanisms are implemented to limit and/or resist movement of the pivotable components based on the positioning inputs. A stability controller can be implemented to control the clutch mechanisms based on sensor data from the sensors to position the device housing in a display position.

In other embodiments, the stability controller is implemented to coordinate one or more of the pivotable components moving together to position the device housing, release the clutch mechanisms to allow movement of the pivotable components into a stable or desirable position of the device housing, and/or engage the clutch mechanisms to limit movement of the pivotable components into an unstable or undesirable position of the device housing. Additionally, the stability controller is implemented to determine an unstable position of the device housing and control the clutch mechanisms to stabilize the device housing. The stability controller can also determine movement towards an unstable position of the device housing based on sensor data, and engage the clutch mechanisms to limit movement of the pivotable components into the unstable position of the device housing. The stability controller is implemented to determine user input to re-position the device housing based on the sensor data that corresponds to the positioning inputs. The stability controller can control the clutch mechanisms to resist the user input with electrically-controlled friction.

BRIEF DESCRIPTION OF THE DRAWINGS

Embodiments of a stability control system are described with reference to the following Figures. The same numbers may be used throughout to reference like features and components that are shown in the Figures.

DETAILED DESCRIPTION

Embodiments of a stability control system are described. As noted above, for a display device or an all-in-one PC with a movable display, a number of display positions can be undesirable for either usability, or balance and stability reasons. A stability control system is implemented to actively avoid and/or prevent positioning a display device or an all-in-one PC in an undesirable or unstable position. The stability control system engages and/or releases clutch mechanisms for smoother positioning movements while also providing stability and support in drawing and touch-screen modes, as well as controlled clutch-release for emergency or undesirable movement and unstable display positions. The stability control system coordinates the clutch mechanisms and various pivotable components moving together to position a display device or an all-in-one PC in a display position.

While features and concepts of a stability control system can be implemented in any number of different devices, systems, and/or configurations, embodiments of a stability control system are described in the context of the following example devices, systems, and methods.

Figure 1:
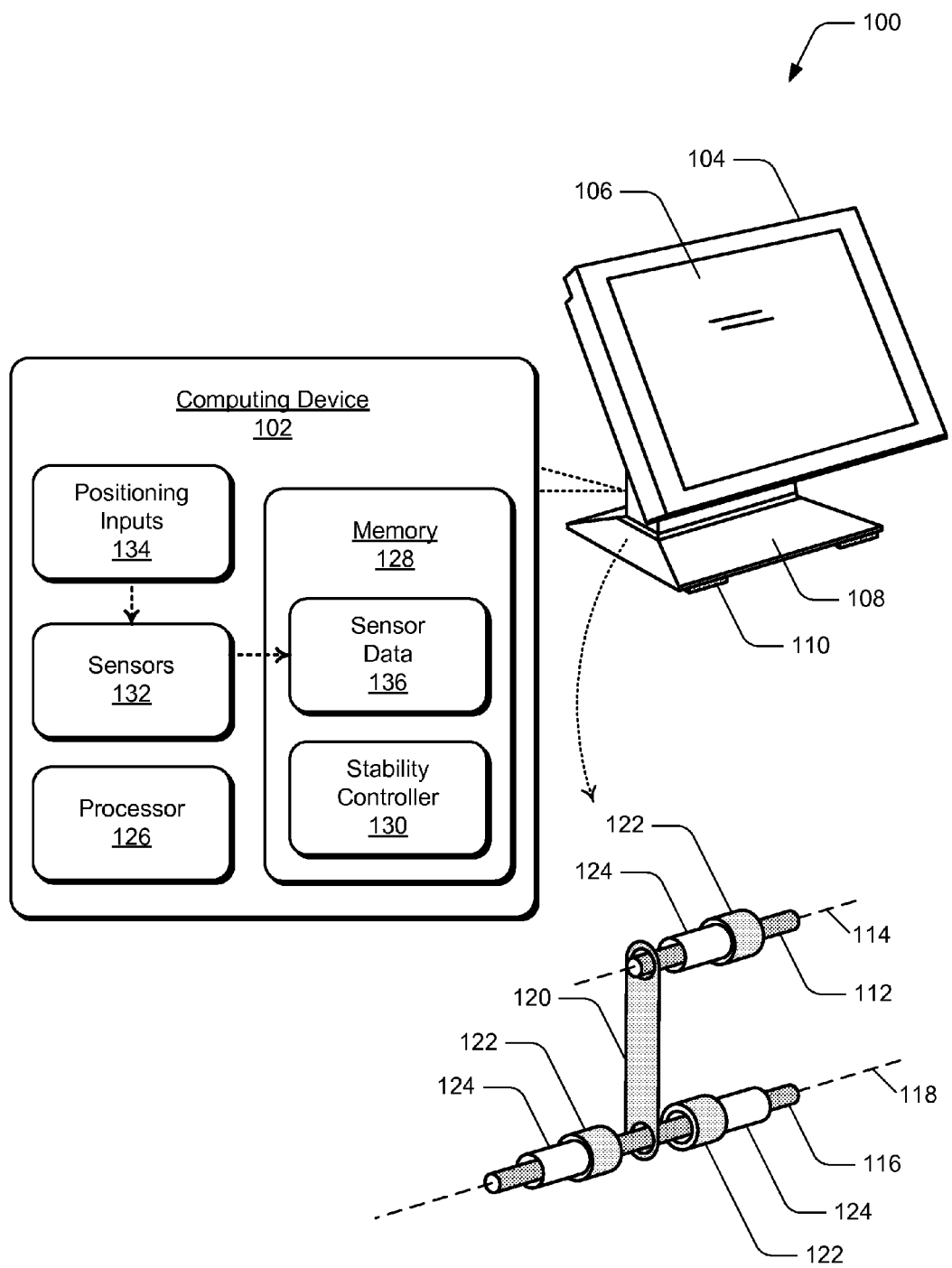
FIG. 1 illustrates an example stability control system in accordance with one or more embodiments.

FIG. 1 illustrates an example stability control system 100 in accordance with one or more embodiments. The example system 100 includes a computing device 102, such as an all-in-one computer (PC) with a device housing 104 that is integrated with a display device 106. The device housing can be raised, lowered, and/or tilted for multiple display positions of the display device. For example, the computing device can be used in an upright position as a vertical display, used flat on a table as a horizontal display, or in any angled position between vertical and horizontal. In this example, the computing device includes a device base 108 that is coupled to support the device housing. The computing device also includes device supports 110 (commonly referred to as "feet") that are integrated into the device base to support the computing device when placed on a surface.

In the stability control system 100, the computing device 102 includes a pivotable component 112 that pivots on an axis 114, and includes another pivotable component 116 that pivots on an axis 118. The pivotable components are implemented to pivot in coordination to position the device housing 104 in one of multiple display positions, and the pivotable components are mechanically-linked by a linkage 120. Additionally, clutch mechanisms 122 are implemented to engage and limit or resist movement of the pivotable components, or release and allow movement of the pivotable components. In this example, a dual-pivot system is illustrated, although a device may include any number of pivotable components that pivot in coordination to position the device housing in a display position.

In this example, the pivotable components 112 and 116, and the clutch mechanisms 122, are shown merely for illustration. In practice, the pivotable components and clutch mechanisms can be implemented in any number of configurations with various differing components. In implementations, the clutch mechanisms may be implemented as clutch barrels, rotary disc or drum brakes, particle clutches, electromagnetic brakes, interference and/or friction fit locks (e.g., one-way roller bearings), and/or as any other type of clutching mechanism. The clutch mechanisms may also be activated by actuators 124 that are implemented to initiate the clutch mechanisms engaging and/or releasing the pivotable components.

In the stability control system 100, the computing device 102 can be implemented with various components, such as a processor 126 (e.g., any of microprocessors, controllers, and the like) and memory 128 (e.g., a computer-readable storage media device) that enables data storage. The processor and memory of the computing device implement a stability controller 130 as computer-executable instructions, such as a software application, that is executable to implement the various embodiments of a stability control system as described herein.

The computing device 102 also includes various sensors 132 that detect positioning inputs 134, such as user force inputs to re-position (e.g., raise, lower, or tilt) the device housing, and the sensors generate sensor data 136. In implementations, the sensors 132 can include any one or combination of capacitive, resistive, and inductive touch sensors, as well as mechanical buttons, rotary and linear pressure sensors, force sensors, force sensitive resistors, accelerometers, and/or rotary and linear potentiometers to detect user contact with the device. For example, the device supports 110 can be integrated with pressure sensors that are implemented to detect pressure inputs at the device supports when the computing device is positioned on a surface. The positioning inputs 134 can include any one or combination of a current position of the device housing, the sensed pressure on the device supports, and/or user force inputs to re-position the device housing when positioning the display device for use.

In embodiments, the stability controller 130 is implemented to control the clutch mechanisms 122 based on the sensor data 136 from the sensors 132 to coordinate one or more of the pivotable components 112 and 116 moving together and position the device housing in a display position. The stability controller is also implemented to engage the clutch mechanisms to limit movement of the pivotable components into an unstable or undesirable position of the device housing, and/or release the clutch mechanisms to allow movement of the pivotable components into a stable or desirable position of the device housing. The stability controller can also determine an unstable position of the device housing and control the clutch mechanisms to stabilize the device housing in a stable position. In implementations, rotary potentiometers or accelerometers can be implemented to provide the positioning inputs and sensor data to the stability controller.

In addition, the stability controller 130 is implemented to determine movement towards an unstable position of the device housing 104 based on the sensor data 136 that corresponds to the positioning inputs 134, and engage the clutch mechanisms 122 to limit movement of the pivotable components 112 and 116 into the unstable position. The stability controller 130 can determine user input, such as force inputs, to re-position the device housing based on the sensor data and control the clutch mechanisms to resist the user input with electrically-controlled friction. The stability controller can also be implemented to control the clutch mechanisms to counter-balance varying weights of the device so that user input force feels uniform to the user over the range of the non-linear forces as the device housing is moved. The apparent force that the user applies to move the device is then approximately constant and close to zero (e.g., so that the device seems to float, such as like having a force follower).

Figure 2:
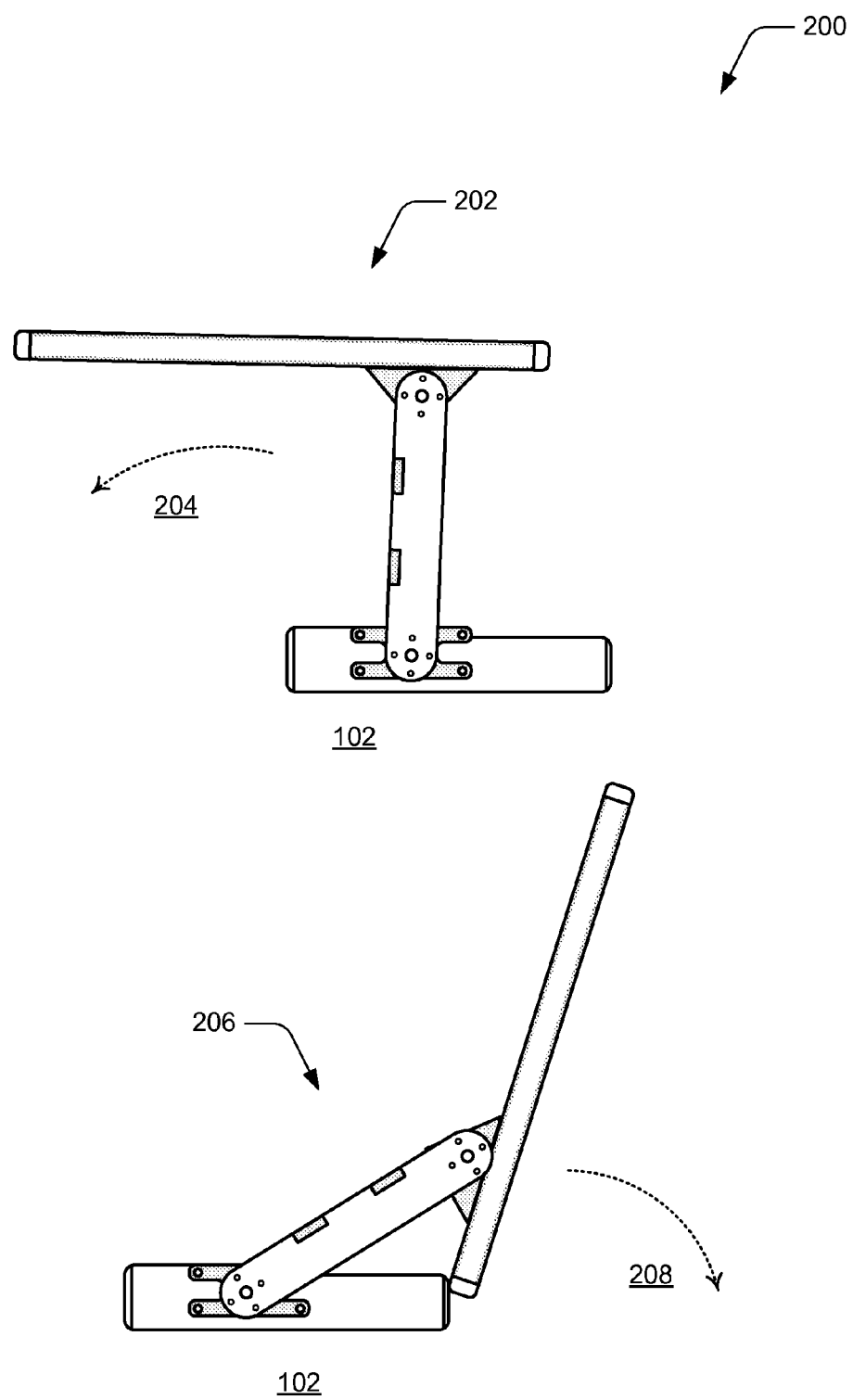
FIG. 2 illustrates examples of unstable or undesirable display positions of a display device, or a computing device that includes an integrated display device.

FIG. 2 illustrates examples 200 of unstable or undesirable display positions of a display device, or a computing device, such as the all-in-one computing device 102 described with reference to FIG. 1. In these examples, the computing device is shown in an unstable rearward leaning position 202 that may have a tendency to tip over backward as shown at 204. The computing device is also shown in an unstable forward leaning position 206 that may have a tendency to tip over forward as shown at 208, which levers the display against the base and damages the device.

The stability controller 130 can determine movement towards one of the unstable positions of the device and engage the clutch mechanisms 122 to limit movement of the pivotable components 112 and 116 into the unstable position of the display device. For example, if the display device 106 (e.g., integrated into the device housing 104 of the computing device 102) is tilted to a rearward limit by user input, the clutch mechanisms that allow forward tilt can be released, while the clutch mechanisms that allow rearward tilt would be engaged to prevent the display device being positioned in the unstable rearward leaning position 202. Similarly, if the display device is tilted too far forward (so as to lever the display against the base), the clutch mechanisms that allow rearward tilt or movement can be released, while the clutch mechanisms that allow forward tilt would remain engaged to prevent further forward movement into the unstable forward leaning position 206.

Figure 3:
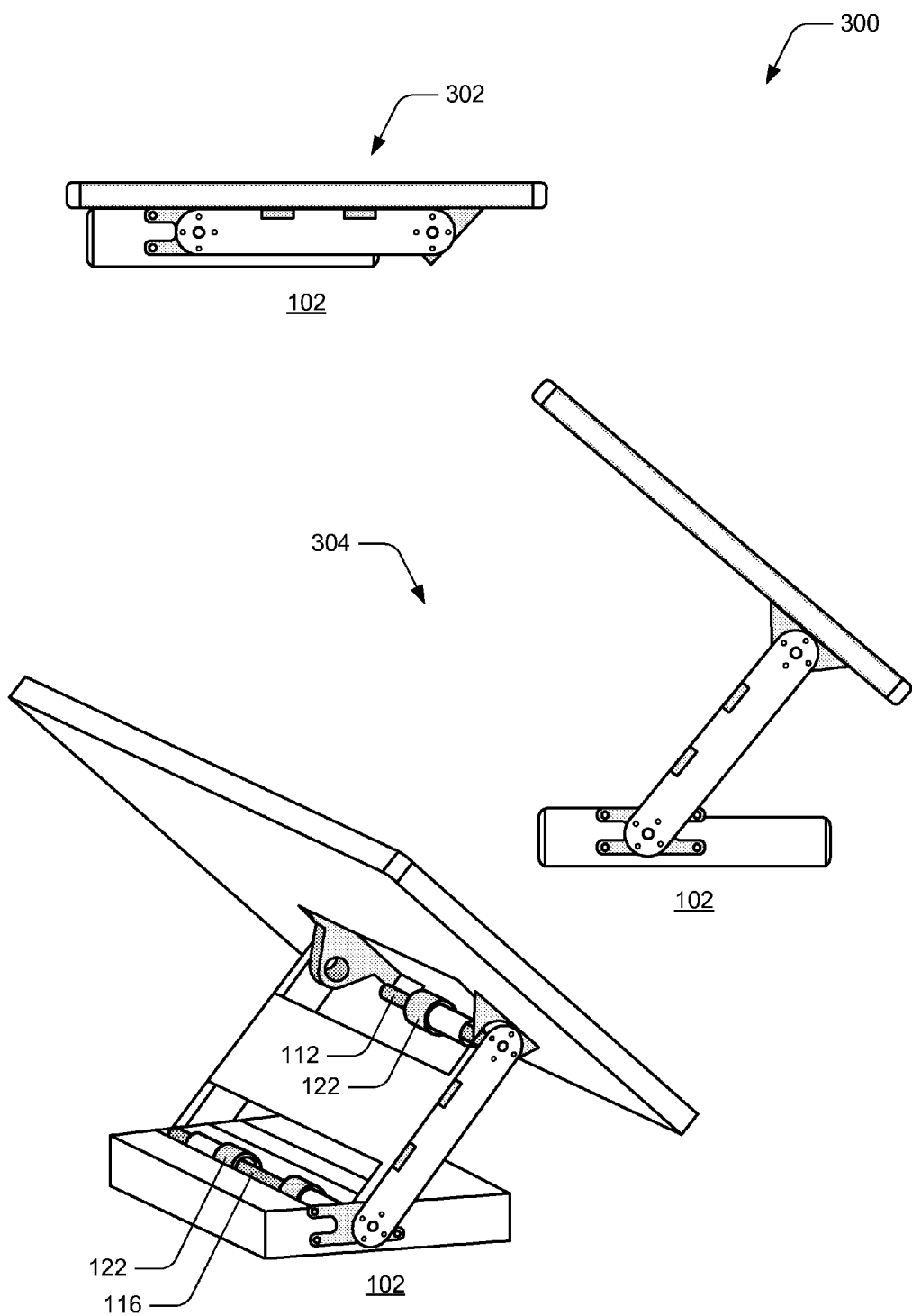
FIG. 3 illustrates examples of stable display positions of a display device, or a computing device that includes an integrated display device.

FIG. 3 illustrates examples 300 of stable display positions of a display device, or a computing device, such as the all-in-one computing device 102 described with reference to FIG. 1. In these examples, the computing device is shown in a stable horizontal position 302, and is shown in a stable display position 304. Additionally, examples of the various pivotable components 112 and 116, and the clutch mechanisms 122 are shown installed in the computing device in the stable display position 304.

Example method 400 is described with reference to FIG. 4 in accordance with one or more embodiments of a stability control system. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. Further, the features described herein are platform-independent and can be implemented on a variety of computing platforms having a variety of processors.

Figure 4:
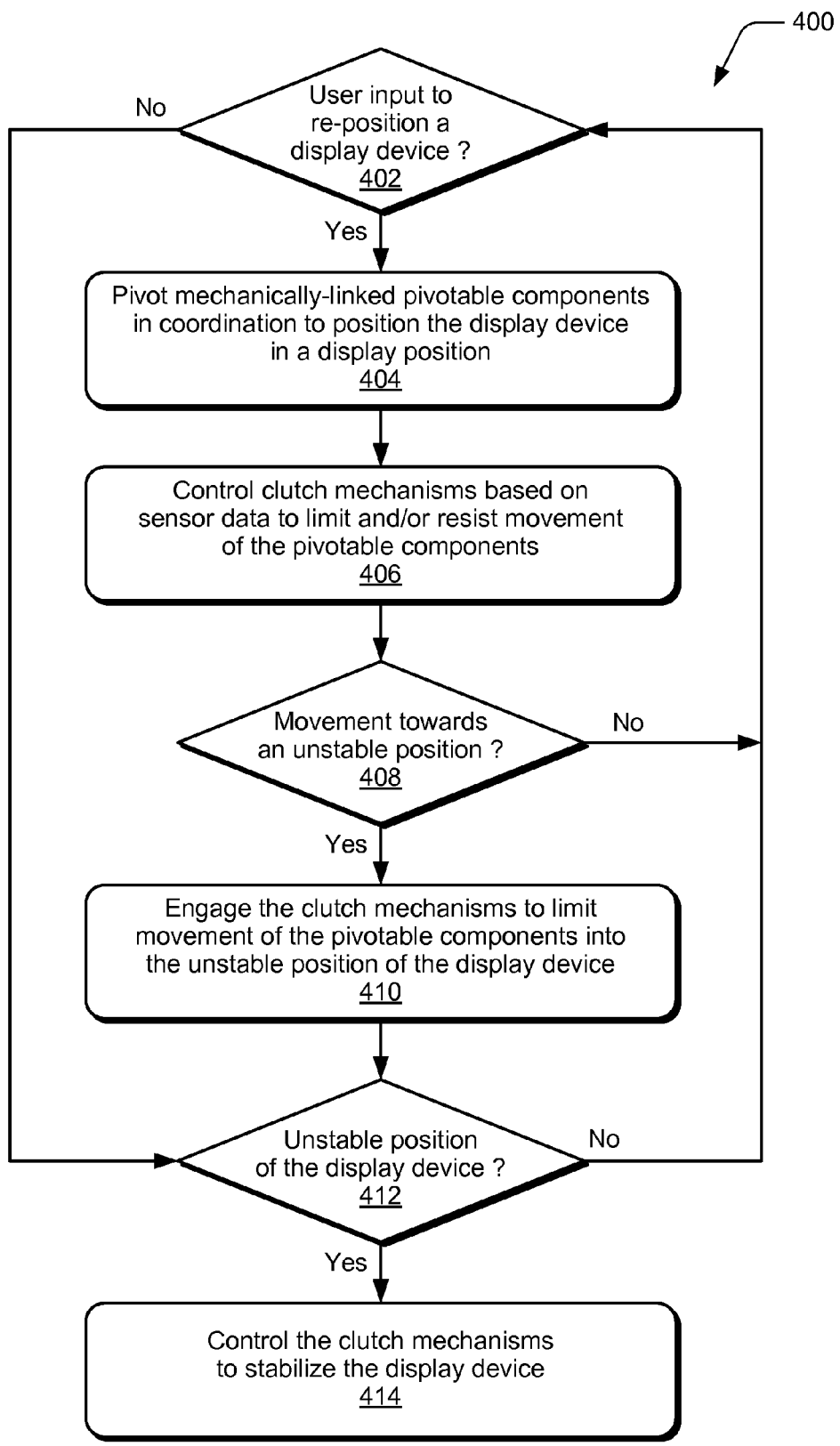
FIG. 4 illustrates example method(s) of a stability control system in accordance with one or more embodiments.

FIG. 4 illustrates example method(s) 400 of a stability control system. The order in which the method blocks are described are not intended to be construed as a limitation, and any number of the described method blocks can be combined in any order to implement a method, or an alternate method.

At block 402, a determination is made as to whether user input is received to re-position a display device. For example, the sensors 132 (FIG. 1) detect positioning inputs when received as user input to re-position (e.g., raise, lower, or tilt) the display device 106 (e.g., integrated into the device housing 104 of the computing device 102) to one of multiple display positions, and the stability controller 130 determines that the positioning inputs correspond to the user input to re-position the display device. If user input is received to re-position the display device (i.e., yes from block 402), then at block 404, mechanically-linked pivotable components are pivoted in coordination to position the display device in a display position. For example, the pivotable components 112 and 116 are mechanically-linked, and one or more of the pivotable components pivot in coordination to position the display device in a display position.

At block 406, clutch mechanisms are controlled based on sensor data to limit and/or resist movement of the pivotable components to position the display device in the display position. For example, the stability controller 130 controls the clutch mechanisms 122 to limit and/or resist movement of the pivotable components 112 and 116 to position the display device. The stability controller engages the clutch mechanisms 122 to limit movement of the pivotable components into an unstable or undesirable position of the display device. Alternatively, the stability controller releases the clutch mechanisms to allow movement of the pivotable components into a stable or desirable position of the display device. The stability controller can also control the clutch mechanisms to resist a user input to re-position the display device with electrically-controlled friction. If no user input is detected (i.e., no from block 402), then the method continues at block 412 as described below to determine whether the display device is in an unstable position.

At block 408, a determination is made as to whether the user input causes movement towards an unstable position of the display device. For example, the stability controller 130 determines from the sensor data 136 that is based on the detected positioning inputs 134 whether the user input will position the display device in an unstable position. If the user input is movement towards an unstable position (i.e., yes from block 408), then at block 410, the clutch mechanisms are engaged to limit movement of the pivotable components into the unstable position of the display device. For example, the stability controller 130 initiates engaging the clutch mechanisms 122 to limit movement of the pivotable components 112 and 116 to the unstable position of the display device. If the user input is not moving towards an unstable position (i.e., no from block 408), then the method continues at block 402 to monitor for and/or detect a user input to re-position the display device.

At block 412, a determination is made as to whether the display device is in an unstable position based on the sensor data. For example, the stability controller 130 detects whether the display device is positioned in an unstable position. If the stability controller does detect that the display device is positioned in an unstable position (i.e., yes from block 412), then at block 414, the stability controller controls the clutch mechanisms 122 to stabilize the display device. If the stability controller does not detect that the display device is positioned in an unstable position (i.e., no from block 412), then the method continues at block 402 to monitor for and/or detect a user input to re-position the display device.

Figure 5:
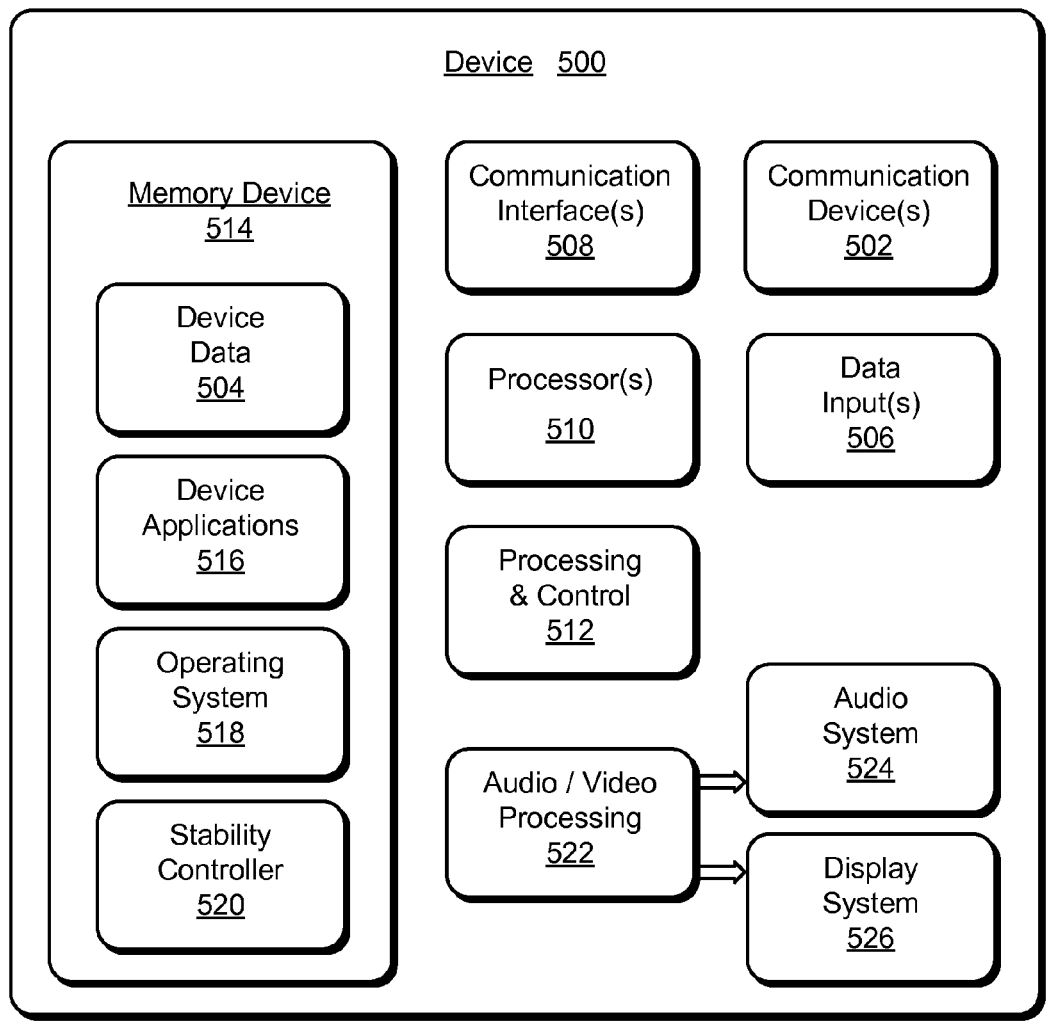
FIG. 5 illustrates various components of an example device in which embodiments of a stability control system can be implemented.

FIG. 5 illustrates various components of an example device 500 that can be implemented as any of the devices, or services implemented by devices, described with reference to the previous FIGS. 1-4. In embodiments, the device may be implemented as any one or combination of a computing device, all-in-one computer, consumer, user, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 506 via which any type of data, media content, and/or inputs can be received, such as user-selectable inputs and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 includes one or more processors 510 (e.g., any of microprocessors, controllers, and the like) which process various computer-executable instructions to control the operation of the device. Alternatively or in addition, the device can be implemented with any one or combination of software, hardware, firmware, or fixed-logic circuitry that is implemented in connection with processing and control circuits which are generally identified at 512. The device 500 also includes one or more memory devices 514 (e.g., computer-readable storage media devices) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store data and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 514 provides data storage mechanisms to store the device data 504, other types of information and/or data, and various device applications 516. For example, an operating system 518 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 516 include a stability controller 520 that implements embodiments of a stability control system as described herein.

The device 500 also includes an audio and/or video processing system 522 that generates audio data for an audio system 524 and/or generates display data for a display system 526. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of a stability control system have been described in language specific to features and/or methods, the subject of the appended claims is not necessarily limited to the specific features or methods described. Rather, the specific features and methods are disclosed as example implementations of a stability control system.

The invention claimed is:
1. A computing device, comprising:
   a device housing integrated with a display device and configured to tilt for multiple display positions;
   pivotable components that are mechanically-linked and configured to pivot in coordination to position the device housing in a display position;
   sensors configured to detect positioning inputs that are received to re-position the device housing;
   clutch mechanisms configured to at least one of limit or resist movement of the pivotable components based on the positioning inputs; and
   a stability controller configured to determine user input to re-position the device housing based on sensor data that corresponds to the positioning inputs.

2. A computing device as recited in claim 1, wherein the stability controller is configured to control the clutch mechanisms based on the sensor data from the sensors.

3. A computing device as recited in claim 1, wherein the stability controller is configured to coordinate one or more of the pivotable components moving together to position the device housing.

4. A computing device as recited in claim 1, wherein the stability controller is configured to engage the clutch mechanisms to limit movement of the pivotable components into an unstable position of the device housing.

5. A computing device as recited in claim 1, wherein the stability controller is configured to release the clutch mechanisms to allow movement of the pivotable components into a stable position of the device housing.

6. A computing device as recited in claim 1, wherein the stability controller is configured to determine an unstable position of the device housing and control the clutch mechanisms to stabilize the device housing.

7. A computing device as recited in claim 1, wherein the stability controller is configured to determine movement towards an unstable position of the device housing based on the sensor data and engage the clutch mechanisms to limit movement of the pivotable components into the unstable position of the device housing.

8. A computing device as recited in claim 1, wherein the stability controller is further configured to control the clutch mechanisms to resist the user input with electrically-controlled friction.

9. A method, comprising:
   detecting with sensors, positioning inputs to re-position a display device to one of multiple display positions;
   pivoting mechanically-linked pivotable components in coordination to position the display device in a display position;
   controlling clutch mechanisms based on sensor data to at least one of limit or resist movement of the pivotable components to position the display device in the display position; and
   determining user input to re-position the display device based on the sensor data that corresponds to the positioning inputs.

10. A method as recited in claim 9, further comprising coordinating one or more of the pivotable components moving together to position the display device.

11. A method as recited in claim 9, further comprising engaging the clutch mechanisms to limit movement of the pivotable components into an unstable position of the display device.

12. A method as recited in claim 9, further comprising releasing the clutch mechanisms to allow movement of the pivotable components into a stable position of the display device.

13. A method as recited in claim 9, further comprising:
   determining an unstable position of the display device; and controlling the clutch mechanisms to stabilize the display device.

14. A method as recited in claim 9, further comprising:
determining movement towards an unstable position of the display device based on the sensor data; and
engaging the clutch mechanisms to limit movement of the pivotable components into the unstable position of the display device.

15. A method as recited in claim 9, further comprising:
controlling the clutch mechanisms to resist the user input with electrically controlled friction.

16. A stability control system, comprising:
pivotable components that are mechanically-linked and configured to pivot in coordination to position a display device in one of multiple display positions;
clutch mechanisms configured to at least one of limit or resist movement of the pivotable components; and
a stability controller configured to determine user input to re-position the display device based on sensor data that corresponds to positioning inputs, and control the clutch mechanisms based on the sensor data that corresponds to the positioning inputs to re-position the display device in a display position.

17. A stability control system as recited in claim 16, wherein the stability controller is configured to determine movement towards an unstable position of the display device based on the sensor data, and engage the clutch mechanisms to limit movement of the pivotable components into the unstable position of the display device.

18. A stability control system as recited in claim 16, wherein the stability controller is configured to control the clutch mechanisms to resist the user input with electrically-controlled friction.

19. A stability control system as recited in claim 16, wherein the stability controller is configured to one of:
engage the clutch mechanisms to limit movement of the pivotable components into an unstable position of the display device; or
release the clutch mechanisms to allow movement of the pivotable components into a stable position of the display device.

20. A stability control system as recited in claim 16, wherein the stability controller is configured to determine an unstable position of the display device and control the clutch mechanisms to stabilize the display device.

\* \* \* \* \*